United States Patent
Yim et al.

(10) Patent No.: US 11,223,745 B2
(45) Date of Patent: Jan. 11, 2022

(54) DEVICE AND METHOD FOR CONTROLLING COLOR GAMUT, AND DISPLAY DEVICE INCLUDING THE DEVICE

(71) Applicant: SAMSUNG DISPLAY CO., LTD., Yongin-si (KR)

(72) Inventors: Dale Yim, Yongin-si (KR); Geun Young Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/394,204

(22) Filed: Apr. 25, 2019

(65) Prior Publication Data

US 2020/0045206 A1 Feb. 6, 2020

(30) Foreign Application Priority Data

Aug. 2, 2018 (KR) .......................... 10-2018-0090319

(51) Int. Cl.
*H04N 1/60* (2006.01)
*G09G 5/06* (2006.01)

(52) U.S. Cl.
CPC ............ *H04N 1/6019* (2013.01); *G09G 5/06* (2013.01); *H04N 1/6008* (2013.01); *H04N 1/6058* (2013.01); *G09G 2320/0285* (2013.01); *G09G 2320/043* (2013.01); *G09G 2360/144* (2013.01)

(58) Field of Classification Search
CPC .............................. H04N 1/6019; G09G 5/06
See application file for complete search history.

(56) References Cited

U.S. PATENT DOCUMENTS

| | | | |
|---|---|---|---|
| 2006/0007108 A1* | 1/2006 | Utsumi | G09G 3/3413 345/102 |
| 2007/0139405 A1* | 6/2007 | Marcinkiewicz | H04N 1/6088 345/207 |
| 2009/0051985 A1* | 2/2009 | Matsuo | H04N 1/6058 358/539 |
| 2014/0210802 A1* | 7/2014 | Myers | G09G 5/06 345/207 |
| 2016/0078793 A1* | 3/2016 | Aimonen | G06T 7/90 345/589 |
| 2019/0251324 A1 | 8/2019 | Yim et al. | |

FOREIGN PATENT DOCUMENTS

| | | |
|---|---|---|
| KR | 1020180029160 A | 3/2018 |
| KR | 1020190098290 A | 8/2019 |

* cited by examiner

*Primary Examiner* — Matthew Salvucci
(74) *Attorney, Agent, or Firm* — Cantor Colburn LLP

(57) ABSTRACT

A device for controlling a color gamut includes: a color mapping module which converts a source image signal, based on a first color gamut look-up table; and a color gamut shift module which sets a second color gamut look-up table, based on a grayscale value determined corresponding to an external factor or user setting. When the color gamut shift module is enabled, the color mapping module converts the source image signal, based on the second color gamut look-up table.

15 Claims, 7 Drawing Sheets

FIG. 5
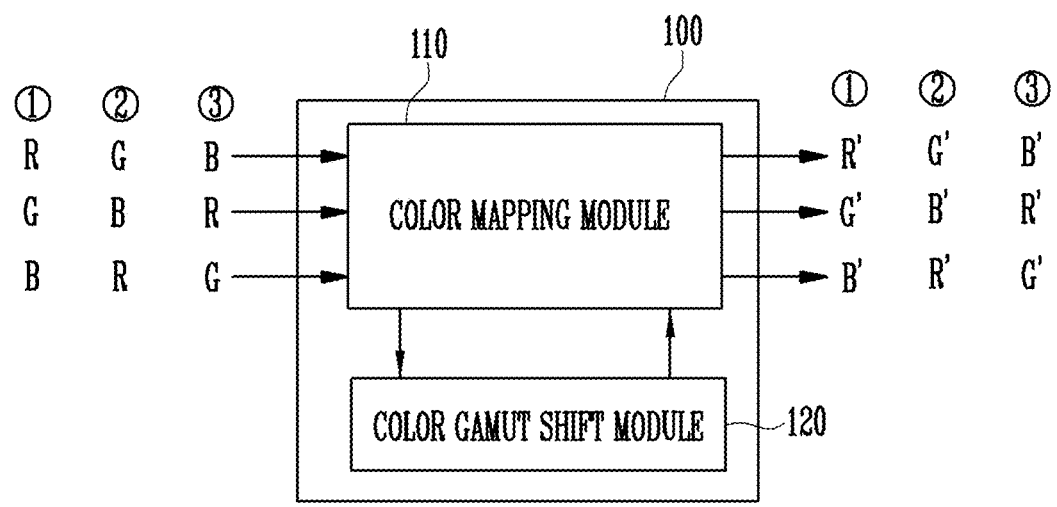
(a)
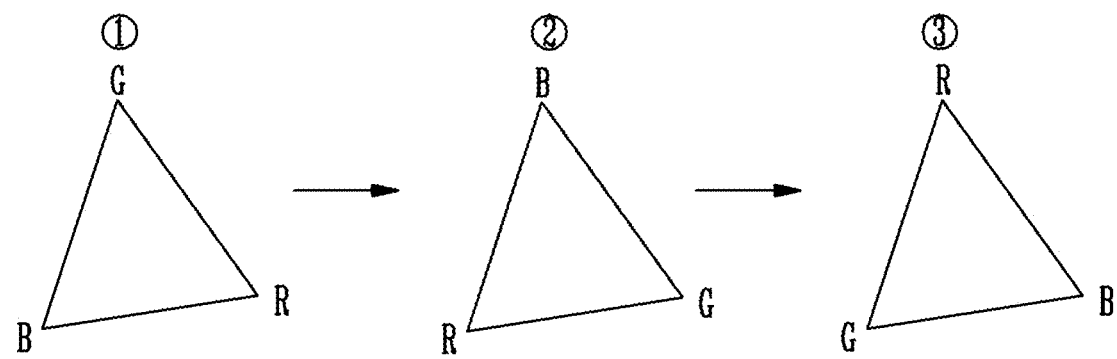
(b)

FIG. 7

| | SETTING | | DOT IMAGE (mA) |
|---|---|---|---|
| | COLORMAP_EN | GAMUTSHIFR_EN | |
| 1. colormap off, gamut shift off | 0 | 0 | 1.2 |
| 2. colormap on, gamut shift off | 1 | 0 | 3.5 |
| 3. colormap on, gamut shift on (max gain) | 1 | 1 | 1.2 |
| 4. colormap on, gamut shift on (middle gain) | 1 | 1 | 2.5 |
| 5. colormap on, gamut shift on (min gain) | 1 | 1 | 3.4 |

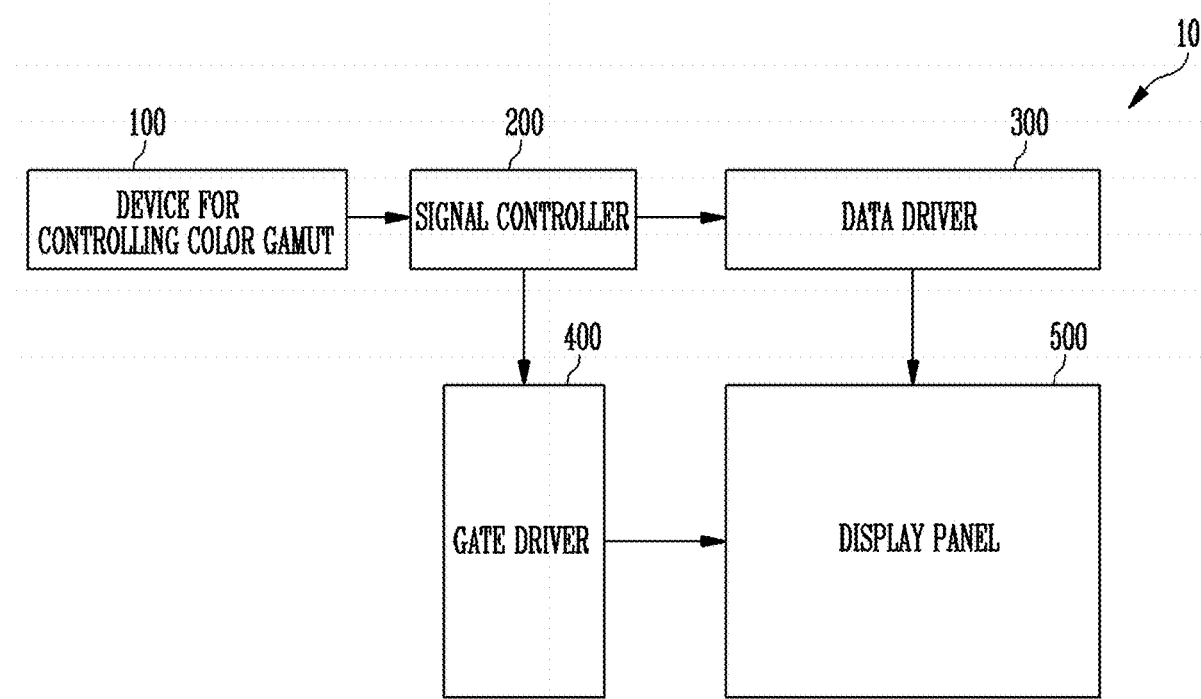

DEVICE AND METHOD FOR CONTROLLING COLOR GAMUT, AND DISPLAY DEVICE INCLUDING THE DEVICE

This application claims priority to Korean patent application 10-2018-0090319, filed on Aug. 2, 2018, and all the benefits accruing therefrom under 35 U.S.C. § 119, the content of which in its entirety is herein incorporated by reference.

BACKGROUND

1. Field

The disclosure generally relates to a device and a method for controlling a color gamut, and a display device including the device, and more particularly, to a device and a method for controlling a color gamut, and a display device including the device that includes a color gamut shift module that adaptively changes a color gamut of the display device.

2. Related Art

In general, a display device, such as a liquid crystal display ("LCD"), implements primary colors by emitting white light of a cold-cathode fluorescent lamp ("CCFL") or a light emitting diode ("LED") toward a back side of a display panel and separating the wavelength band of light, using optical filters of three colors of red, green and blue, which are spatially distributed in the display panel. The display device may display a color image by adjusting various colors and brightnesses through combinations of the primary colors.

A reproducible color gamut formed by the display device generally has a triangle obtained by connecting color coordinates of the three primary colors of red, green and blue in a two-dimensional color coordinate system (e.g., CIE-xy chromaticity chart). The display device using the three primary colors of red, green and blue may perform color correction by performing a color mapping.

SUMMARY

Conventionally, a display device may perform a color correction by performing a color mapping, e.g., by adding a weighted value to a specific color of a source image signal and shifting the color gamut. However, color distortion may occur in the above-described conventional color mapping process.

In a typical display device, current consumption in a white image is relatively small when the color difference between adjacent pixels in a display panel is small, but current consumption in a dot image is relatively large when the color difference between adjacent pixels is large. Therefore, the current consumption may increase when the complexity of an image increases.

Accordingly, a device for controlling a color gamut, which can decrease current consumption of the display panel while accurately expressing a color to be expressed, is desired.

Embodiments provide a device and a method for controlling a color gamut, and a display device including the device that adaptively changes a color gamut of the display device.

Embodiments also provide a device and a method for controlling a color gamut, and a display device including the device that includes a color gamut shift module for adaptively reorganizing a look-up table ("LUT") for color mapping according to an external factor of the display device.

Embodiments also provide a device and a method for controlling a color gamut, and a display device including the device that reduces current consumption of the display device by applying a color gamut shift module designed to be driven with low power.

According to an embodiment of the disclosure, a device for controlling a color gamut includes: a color mapping module which converts a source image signal, based on a first color gamut LUT; and a color gamut shift module which sets a second color gamut LUT, based on a grayscale value determined corresponding to an external factor or user setting, where, when the color gamut shift module is enabled, the color mapping module converts the source image signal, based on the second color gamut LUT.

In an embodiment, the first color gamut LUT may define an output color gamut having a shape obtained by moving grid points of a source color gamut of the source image signal with a same vector, and the second color gamut LUT may define an output color gamut having a shape obtained by moving a white point of the source color gamut to an interpolation point determined according to the grayscale value.

In an embodiment, the color gamut shift module may organize the second gamut LUT by moving move a white point of the first color gamut LUT to an interpolation point determined according to the grayscale value.

In an embodiment, the color gamut shift module may include: a first processor which outputs, as first output values, values obtained by multiplying parameters of the first color gamut LUT and corresponding parameters of a reference LUT determined corresponding to the interpolation point; a second processor which outputs, as second output values, values obtained by dividing the first output values by a predetermined parameter corresponding to an interpolation section including the interpolation point; a third processor which collects the second output values and organizes the second output values as a table having a same dimension as the first color gamut LUT; and a fourth processor which outputs the second color gamut LUT generated by adding the first color gamut LUT and the table.

In an embodiment, the second processor may be defined by a single divider which processes calculations on the first output values in series.

In an embodiment, the color gamut shift module may set the second color gamut LUT in a section in which an enable signal received from a display device has a high level.

In an embodiment, the display device may include N pixels in a vertical direction, and the enable signal may be output with a high level in a section, in which a vertical synchronization signal of the display device has a high level and a horizontal synchronization signal of the display device has an N-th low level, where N is a natural number.

In an embodiment, the external factor may include at least one of a brightness sensed through an illumination sensor and an emotion of a user sensed through a temperature sensor and a pulse sensor.

According to another embodiment of the disclosure, a method for controlling a color gamut includes: receiving a source image signal; when a color gamut shift module is not enabled, converting and outputting the source image signal, based on a first color gamut LUT; and when the color gamut shift module is enabled, converting and outputting the source image signal, based on a second color gamut LUT, where the second color gamut LUT is set based on a grayscale value determined corresponding to an external factor or user setting.

In an embodiment, the first color gamut LUT may define an output color gamut having a shape obtained by moving grid points of a source color gamut of the source image signal with a same vector, and the second color gamut LUT may define an output color gamut having a shape obtained by moving a white point of the source color gamut to an interpolation point determined according to the grayscale value.

In an embodiment, the converting and outputting the source image signal, based on the second color gamut LUT may include: organizing the second color gamut LUT by moving a white point of the first color gamut LUT to an interpolation point determined corresponding to the grayscale value; converting the source image signal, based on the organized second color gamut LUT; and outputting the source image signal converted based on the organized second color gamut LUT.

In an embodiment, the organizing of the second color gamut LUT may include: outputting first output values, which are obtained by multiplying parameters of the first color gamut LUT and corresponding parameters of a reference LUT determined corresponding to the interpolation point; outputting second output values, which are obtained by dividing the first output values by a predetermined parameter corresponding to an interpolation section including the interpolation point; collecting the second output values and organizing the second output values as a table having a same dimension as the first color gamut LUT; and generating the second color gamut LUT by adding the first color gamut LUT and the table.

In an embodiment, the outputting the second output values may be performed by a single divider which processes calculations on the first output values in series.

In an embodiment, the method may further include, before the organizing the second color gamut LUT, receiving an enable signal from a display device. In such an embodiment, the organizing the second color gamut LUT may be performed in a section in which the enable signal has a high level.

In an embodiment, the display device may include N pixels in a vertical direction, and the enable signal may be output with a high level in a section, in which a vertical synchronization signal of the display device has a high level and a horizontal synchronization signal of the display device has an N-th low level, where N is a natural number.

In an embodiment, the external factor may include at least one of a brightness sensed through an illumination sensor and an emotion of a user sensed through a temperature sensor and a pulse sensor.

According to still another embodiment of the disclosure, a display device includes: a device which controls a color gamut, where the device includes a color mapping module which converts a source image signal, based on a first color gamut LUT and a color gamut shift module which sets a second color gamut LUT, based on a grayscale value determined corresponding to an external factor or user setting; a signal controller which outputs data generated based on a converted source image signal; a data driver which outputs a data voltage corresponding to the data as a data signal; and a display panel which outputs an image corresponding to the data voltage, where, when the color gamut shift module is enabled, the color mapping module converts the source image signal, based on the second color gamut LUT.

In an embodiment, the first color gamut LUT may define an output color gamut having a shape obtained by moving grid points of a source color gamut of the source image signal with a same vector, and the second color gamut LUT may define an output color gamut having a shape obtained by moving a white point of the source color gamut to an interpolation point determined according to the grayscale value.

In an embodiment, the color gamut shift module may organize the second color gamut LUT by moving a white point of the first color gamut LUT to an interpolation point determined according to the grayscale value.

In an embodiment, the signal controller may apply an enable signal to the color gamut shift module, and the color gamut shift module may set the second color gamut LUT in a section in which the enable signal has a high level. In such an embodiment, the display panel may include N pixels in a vertical direction, and the enable signal may be output with a high level in a section, in which a vertical synchronization signal of the signal controller has a high level and a horizontal synchronization signal of the signal controller has an N-th low level, where N is a natural number.

BRIEF DESCRIPTION OF THE DRAWINGS

The above and other features of the invention will become more apparent by describing in further detail exemplary embodiments thereof with reference to the accompanying drawings, in which;

FIG. 5 is a diagram illustrating an embodiment of a rotation method of a source image signal according to the disclosure.

FIG. 7 is a table illustrating a simulation result of an embodiment of the method according to the disclosure.

FIG. 8 is a block diagram illustrating an embodiment of a display device including the device according to the disclosure.

DETAILED DESCRIPTION

Figure 1:
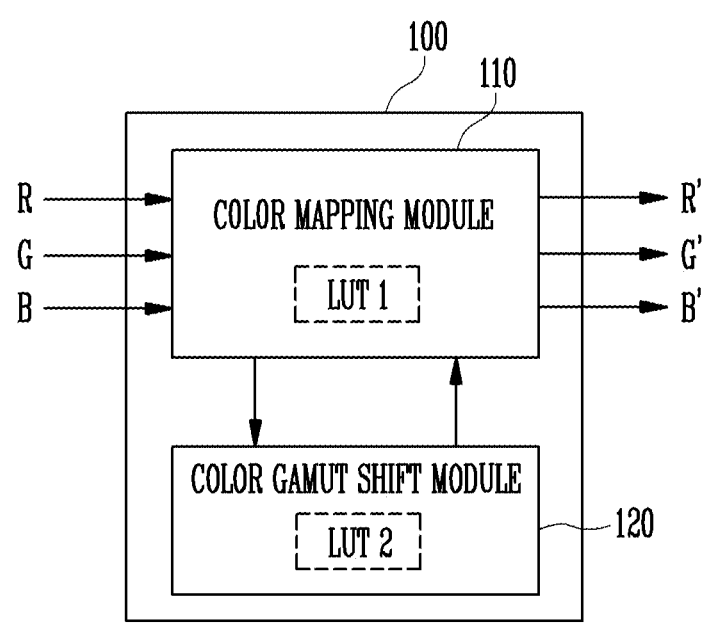
FIG. 1 is a block diagram illustrating an embodiment of a device for controlling a color gamut according to the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "connected" or "coupled" to another element, it can be directly connected or coupled to the another element or be indirectly connected or coupled to the another element with one or more intervening elements interposed therebetween. In contrast, when an element is referred to as being "directly connected" or "directly coupled" to another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of a device and a method for controlling a color gamut will be described in detail with reference to the accompanying drawings.

In the following embodiments, a device for controlling a color gamut according to the disclosure adaptively sets an output color gamut with respect to a source image signal according to an external factor. The color gamut is defined by a plurality of grid points in a two-dimensional color coordinate system. For example, the range of the color gamut may be defined by grid points including a red point R, a green point G, a blue point B, a cyan point C, a magenta point M, a yellow point Y, and a white point W. The device according to the disclosure converts the source image signal into an image signal in the output color gamut, using a color gamut look-up table ("LUT") defining the output color gamut. The color gamut LUT may include coordinate values of a plurality of grid points defining the output color gamut, and the coordinate value of each grid point may be configured with an x-axis coordinate value, a y-axis coordinate value, and a z-axis coordinate value. The x-axis coordinate value, the y-axis coordinate value, and the z-axis coordinate value may correspond to a red component, a green component, and a blue component, respectively. When the source image signal is converted into the image signal in the output color gamut, a color gamut that the source image signal has (hereinafter, referred to as a source color gamut) may be converted into the output color gamut.

Figure 2A:
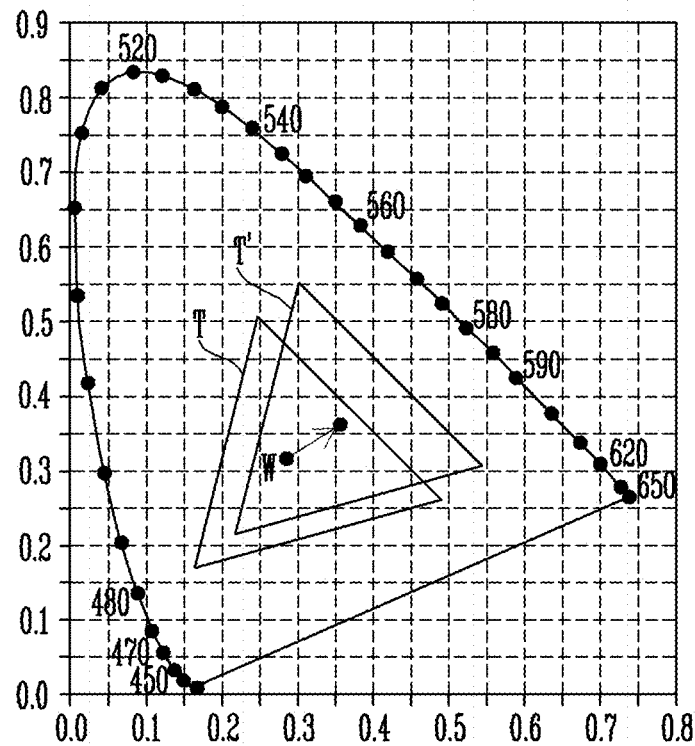
FIG. 2A and FIG. 2B are diagrams illustrating color gamut movement in a color space in driving of an embodiment of the device according to the disclosure.
Figure 2B:
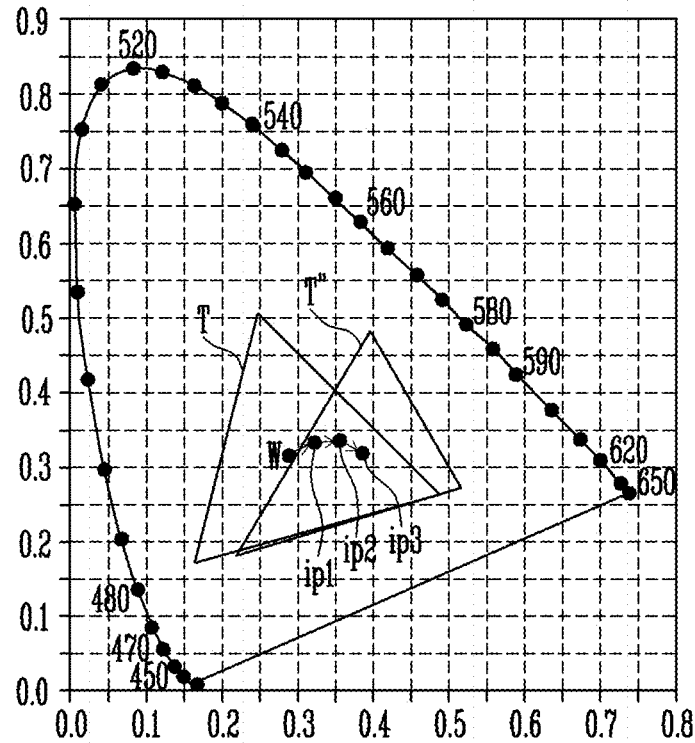

FIG. 1 is a block diagram illustrating an embodiment of a device for controlling a color gamut according to the disclosure. FIG. 2A and FIG. 2B are diagrams illustrating color gamut movement in a color space in driving of an embodiment of the device according to the disclosure.

Referring to FIG. 1, an embodiment of the device 100 may include a color mapping module 110 and a color gamut shift module 120.

The color mapping module 110 may receive a source image signal R, G and B such as sRGB, scRGB, xvYCC, YCbCr, CIELAB or CIE-XYZ, and convert the source image signal based on a color gamut LUT, and then output the converted source image signal R', G' and B'.

In an embodiment, when the color gamut shift module 120 is not enabled, the color mapping module 110 may convert the source image signal R, G and B, based on a first color gamut LUT LUT1. In embodiments of the disclosure, an output color gamut T' defined by the first color gamut LUT LUT1 may have a shape obtained by moving grid points of a source color gamut T with a same vector on the two-dimensional color coordinate system as shown in FIG. 2A.

In an embodiment, a plurality of first color gamut LUTs LUT1 corresponding to a plurality of color reproduction modes, respectively, may be provided. In such an embodiment, the color mapping module 110 may convert the source image signal R, G and B by selecting a first color gamut LUT LUT1 corresponding to a current color reproduction mode among the plurality of first color gamut LUTs LUT1. The color reproduction mode may be selected by an internal setting of a display device including the device 100 or a user setting.

In such an embodiment, when the color gamut shift module 120 is enabled, the color mapping module 110 may convert the source image signal R, G and B, based on a second color gamut LUT LUT2 set by the color gamut to shift module 120. In embodiments of the disclosure, an output color gamut T" defined by the second color gamut LUT LUT2 may have a shape obtained by moving a white point W with an arbitrary vector on the two-dimensional coordinate system as shown in FIG. 2B. As the white point W is moved, shapes of a source color gamut T and the output color gamut T", which are defined by the second color gamut LUT LUT2, may be different from each other.

The color gamut shift module 120 may set the second color gamut LUT LUT2, corresponding to an external factor or a user setting. The external factor may include, for example, a peripheral environment factor such as a brightness sensed through an illumination sensor, etc., a user emotion factor determined through a temperature sensor, a pulse sensor, etc., and the like. The color gamut shift module 120 may set the second color gamut LUT LUT2 by converting the first color gamut LUT LUT1 according to a grayscale value light_sel (shown in FIG. 3) determined corresponding to the external factor. In an embodiment, the color gamut shift module 120 may move a white point W of the first color gamut LUT LUT1 to an interpolation point ip (shown in FIG. 3), corresponding to the grayscale value light_sel determined according to the external factor, and organize the second color gamut LUT LUT2 using the moved interpolation point ip as a whit point W.

The method in which the color gamut shift module 120 sets the second color gamut LUT LUT2 will be described in greater detail with reference to FIG. 3.

By operations of the color mapping module 110 and the color gamut shift module 120, the display device including the device 100 may implement a function capable of reducing visual fatigue of a user, e.g., a blue-light function.

Figure 3:
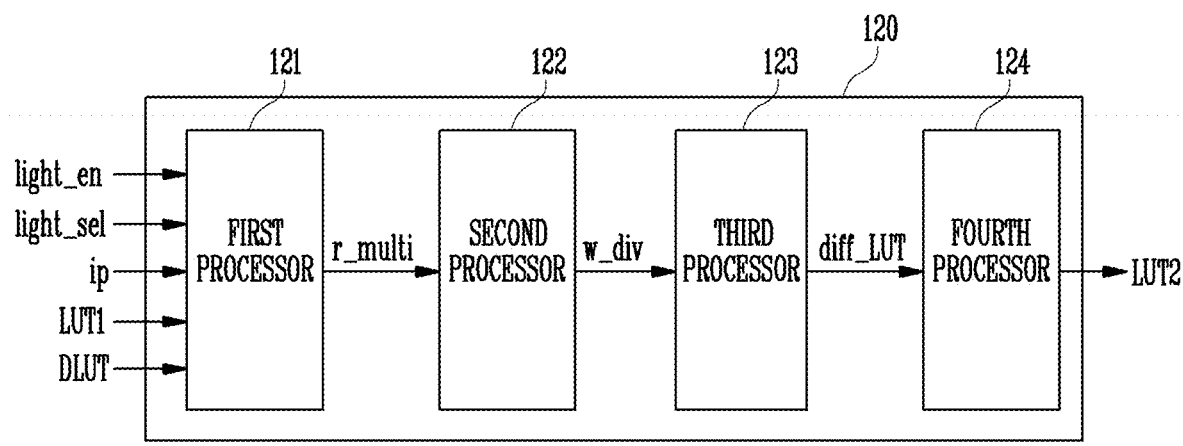
FIG. 3 is a block diagram illustrating an embodiment of a color gamut shift module according to the disclosure.

FIG. 3 is a block diagram illustrating an embodiment of the color gamut shift module according to the disclosure.

Referring to FIG. 3, an embodiment of the color gamut shift module 120 may include first to fourth processors 121 to 124.

The first processor 121 is a component that sets a second color gamut LUT LUT2, and may collect information on a first color gamut LUT LUT1 and an interpolation point ip, to which a white point W of a first color gamut LUT LUT1 is to be moved, corresponding to an external factor or a user setting. In an embodiment, as shown in FIG. 3, the first processor 121 may acquire a grayscale value light_sel determined corresponding to the external factor or the user setting, an interpolation point ip determined corresponding to the grayscale value light_sel, a reference LUT DLUT determined corresponding to the interpolation point ip, and a first color gamut LUT LUT1.

The grayscale value light_sel may have a value from 0 to 255, and be configured to express the corresponding value with 8 bits. The grayscale value light_sel may be previously set to have a specific value corresponding to a parameter indicating an external factor or a user setting. In one embodiment, for example, the grayscale value light_sel may be previously set to have a specific value from 0 to 225, corresponding to a peripheral brightness value sensed through an illumination sensor. The first processor 121 may receive a parameter indicating an external factor or a user setting from the display device, and determine a grayscale value light_sel corresponding to the received parameter or receive the grayscale value light_sel.

The interpolation point ip represents a coordinate value of a point to which the white point W of the first color gamut LUT LUT1 is to be moved, and may be previously set to have a specific value corresponding to a grayscale value light_sel. The first processor 121 may determine the interpolation point ip, corresponding to the acquired grayscale value light_sel, or receive information on the interpolation point ip from the display device.

The reference LUT DLUT is an LUT for storing a value referred to organize the second color gamut LUT LUT2 from the first color gamut LUT LUT1. Like the first color gamut LUT LUT1, the reference LUT DLUT may include coordinate values of a plurality of grid points defining a range of a color gamut. In embodiments of the disclosure, a reference LUT DLUT corresponding to the interpolation point ip may be previously set. In such embodiments of the disclosure, a first reference LUT corresponding to a first interpolation section from the white point W of the first color gamut LUT LUT1 to a first interpolation point ip1, a second reference LUT corresponding to a second interpolation section from the first interpolation point ip1 to a second interpolation point ip2, and a third reference LUT corresponding to a third interpolation section from the second interpolation point ip2 to a third interpolation point ip3 may be previously set. However, the disclosure is not limited to these embodiments. Alternatively, more or less reference LUTs DLUT may be set corresponding to more various interpolation sections. The first processor 121 may select a reference LUT DLUT corresponding to an interpolation section including the determined interpolation point ip.

The first color gamut LUT LUT1 may be received from the display device or the color mapping module 110. In an embodiment of the disclosure, when a plurality of first color gamut LUTs LUT1 corresponding to a plurality of color reproduction modes, respectively, are provided, the first color gamut LUT LUT1 acquired by the first processor 121 may be a first color gamut LUT LUT1 corresponding to a current color reproduction mode among the plurality of first color gamut LUTs LUT1.

The first processor 121 may calculate a first output value r_multi from the first color gamut LUT LUT1 and the reference LUT DLUT, and output the first output value r_multi to the second processor 122. In an embodiment, the first processor 121 may determine a first output value r_multi by multiplying parameters constituting the first color gamut LUT LUT1 and corresponding parameters constituting the reference LUT DLUT, and output the first output value r_multi to the second processor 122. In one embodiment, for example, the first processor 121 may determine a first output value r_multi by multiplying an x-axis coordinate value of a red point R of the first color gamut LUT LUT1 and an x-axis coordinate value of a red point R of the reference LUT DLUT, and transfer the first output value r_multi to the second processor 122. In such an embodiment, the first processor 121 may determine a first output value r_multi by multiplying a y-axis coordinate value of the red point R of the first color gamut LUT LUT1 and a y-axis coordinate value of the red point R of the reference LUT DLUT, and transfer the first output value r_multi to the second processor 122. The first processor 121 may calculate first output values r_multi with respect to all the parameters constituting the first color gamut LUT LUT1 and the reference LUT DLUT, and sequentially transfer the first output values r_multi to the second processor 122.

The second processor 122 may determine a second output value w_div by dividing the first output value r_multi by a parameter corresponding to the interpolation section including the interpolation point ip, and output the second output value w_div to the third processor 123.

In an embodiment, when the interpolation point ip belongs to the first interpolation section, the second processor 122 may determine a second output value w_div by dividing the first output value r_multi by a coordinate value of the corresponding first interpolation point ip1 according to the following Equation 1.

$$w\_div = \frac{r\_multi}{ip1} \quad \text{Equation 1}$$

When the interpolation point ip belongs to the second interpolation section, the second processor 122 may determine a second output value w_div by dividing the first output value r_multi by a value obtained by subtracting the coordinate value of the first interpolation point ip1 from a coordinate value of the second interpolation point ip2 according to the following Equation 2.

$$w\_div = \frac{r\_multi}{(ip2 - ip1)} \quad \text{Equation 2}$$

When the interpolation point ip belongs to the third interpolation section, the second processor 122 may determine a second output value w_div by dividing the first output value r_multi by a value obtained by subtracting the coordinate value of the second interpolation point ip2 from a coordinate value of the third interpolation point ip3 according to the following Equation 3.

$$w\_div = \frac{r\_multi}{(ip3 - ip2)} \quad \text{Equation 3}$$

In an embodiment, the second processor 122 may determine second output values w_div by respectively processing the first output values r_multi sequentially transferred from the first processor 121. In such an embodiment, the second processor 122 is a time-divisionally operated single divider. The second processor 122 may perform calculations on all the first output values r_multi in series, and sequentially transfer second output values w_div determined by performing the calculations to the third processor 123.

In an embodiment, the third processor 123 may collect the second output values w_div transferred to the second processor 122 and reorganize the second output values w_div as a table. In such an embodiment, the third processor 123 may reorganize the second output values w_div as an LUT diff_LUT having a same dimension as the first color gamut LUT LUT1, and transfer the LUT diff_LUT to the fourth processor 124.

In an embodiment, the fourth processor 124 may determine a final second color gamut LUT LUT2 by calculating the LUT diff_LUT transferred from the third processor 123 and the first color gamut LUT LUT1. In such an embodiment, the fourth processor 124 may generate a final second color gamut LUT LUT2 by adding the first color gamut LUT LUT1 and the LUT diff_LUT transferred from the third processor 123, and transfer the final second color gamut LUT LUT2 to the color mapping module 110.

In an embodiment, determinations of the respective values constituting the second color gamut LUT LUT2 are performed in series by the first processor 121, the second processor 122 and the third processor 123. In such an embodiment, calculations are not performed in parallel, using a plurality of dividers, but performed in series by time-dividing a single divider, and output values calculated in series through the third processor 123 are reorganized in the form of a table. According to an embodiment of the disclosure, the number of the dividers having large current consumption is minimized, so that additional current consumption caused when the color gamut shift module 120 is provided may be effectively prevented.

FIG. 3 illustrates that the first to fourth processors 121 to 124 are provided separately from each other, at least some of the components may be integrated and be selectively implemented as a single component.

Figure 4:
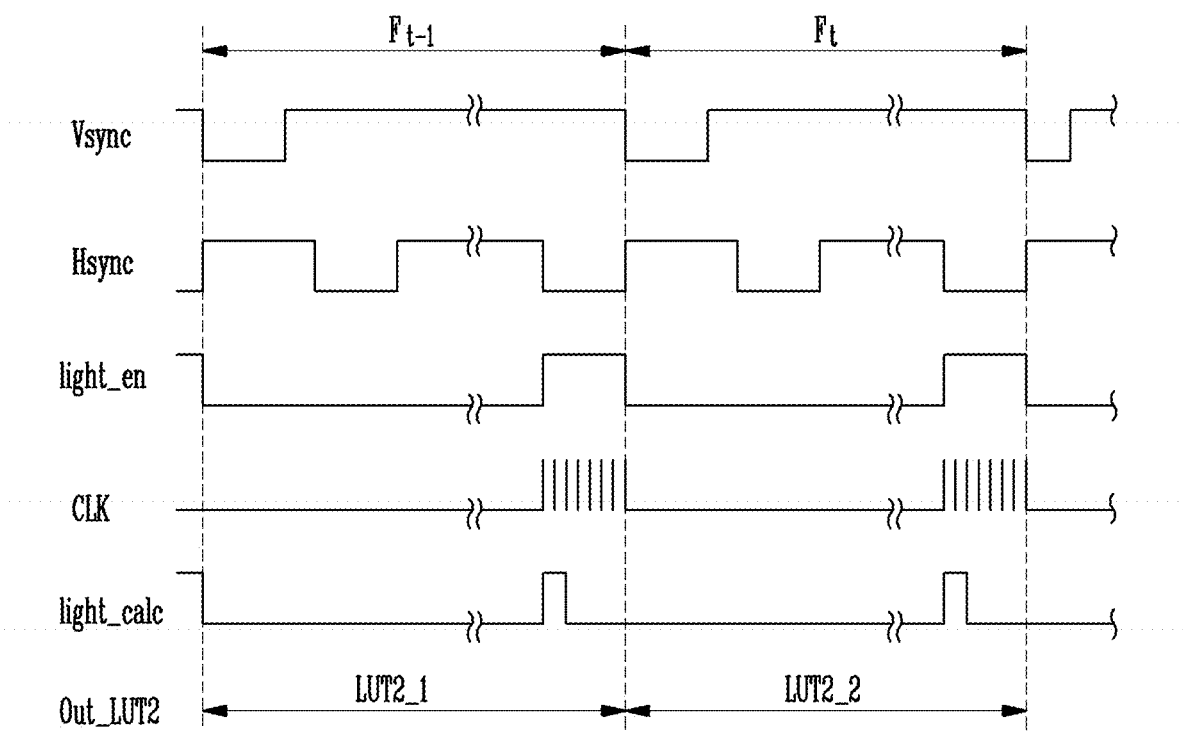
FIG. 4 is a timing diagram of a driving signal of an embodiment of the device according to the disclosure.

FIG. 4 is a timing diagram of a driving signal of an embodiment of the device according to the disclosure.

In embodiments of the disclosure, the color gamut shift module 120 may be enabled when an enable signal light_en is received, to perform the above-described setting of the second color gamut LUT LUT2 (light_calc). In an embodiment, the color gamut shift module 120 may be enabled when the enable signal light_en is received from the display device, and perform the setting of the second color gamut LUT LUT2. In embodiments of the disclosure, when N pixels are provided in a vertical direction in the display device (here, N is a natural number), the enable signal light_en may output a high level in a section in which a vertical synchronization signal Vsync that is a signal for distinguishing frame sections Ft-1 and Ft of the display device has a high level and a horizontal synchronization signal Hsync that is a signal for distinguishing horizontal sections has a N-th low level. Consequently, the color gamut shift module 120 sets a second color gamut LUT LUT2 at a point of time when a previous frame section Ft-1 is ended, and enables the set second color gamut LUT LUT2 to be applied in a next frame Ft. Referring to the timing diagram of FIG. 4, a secondary second color gamut LUT LUT2_2 is set while a primary second color gamut LUT LUT2_1 is being applied in the previous frame section Ft-1, and the set secondary second color gamut LUT LUT2_2 is applied in the next frame section Ft (Out LUT2).

The color gamut shift module 120 may receive a clock signal CLK from, for example, the display device during the section in which the enable signal light_en has the high level. The clock signal CLK may be masked to be enabled only in the section in which the enable signal light_en has the high level. The masking of the clock signal CLK can reduce the current consumption amount when the color gamut shift module 120 is driven.

The section light_calc for the color gamut shift module 120 to set the second color gamut LUT LUT2 may correspond to a time corresponding to, for example, 48 clocks, and may be shorter than the section in which the enable signal light_en has the high level.

FIG. 5 is a diagram illustrating an embodiment of a rotation method of a source image signal according to the disclosure.

In an embodiment of the disclosure, the color mapping module 110 may receive a rotated source image signal R, G and B from the display device.

In an embodiment, when the color mapping module 110 includes three input interfaces for respective R, G and B signals, the color mapping module 110, as shown in (a) of FIG. 5, may receive the G signal through an R input interface, receive the B signal through a G input interface, and receive the R signal through a B input interface. In such an embodiment, the color mapping module 110 may receive the B signal through the R input interface, receive the R signal through the G input interface, and receive the G signal through the B input interface.

In an alternative embodiment, when the color mapping module 110 is configured to sequentially receive the R, G and B signals, a source image signal may be received to the color mapping module 110 in a sequence of G, B and R, or a source image signal may be received to the color mapping module 110 in a sequence of B, R and G.

The color mapping module 110 may perform color gamut mapping, using a first color gamut LUT LUT1 or a second color gamut LUT LUT2 identical to a first color gamut LUT LUT1 or a second color gamut LUT LUT2 used when the source image signal R, G and B is not rotated. However, in such an embodiment, since the source image signal R, G and B is rotated, different correction values may be applied to the substantially same color in the converted source image signal R', G' and B'. Accordingly, in such an embodiment, an effect that a color gamut LUT is additionally changed may be obtained (e.g., the color gamut LUT is reset such that a color gamut is rotated as shown in (b) of FIG. 5).

Figure 6:
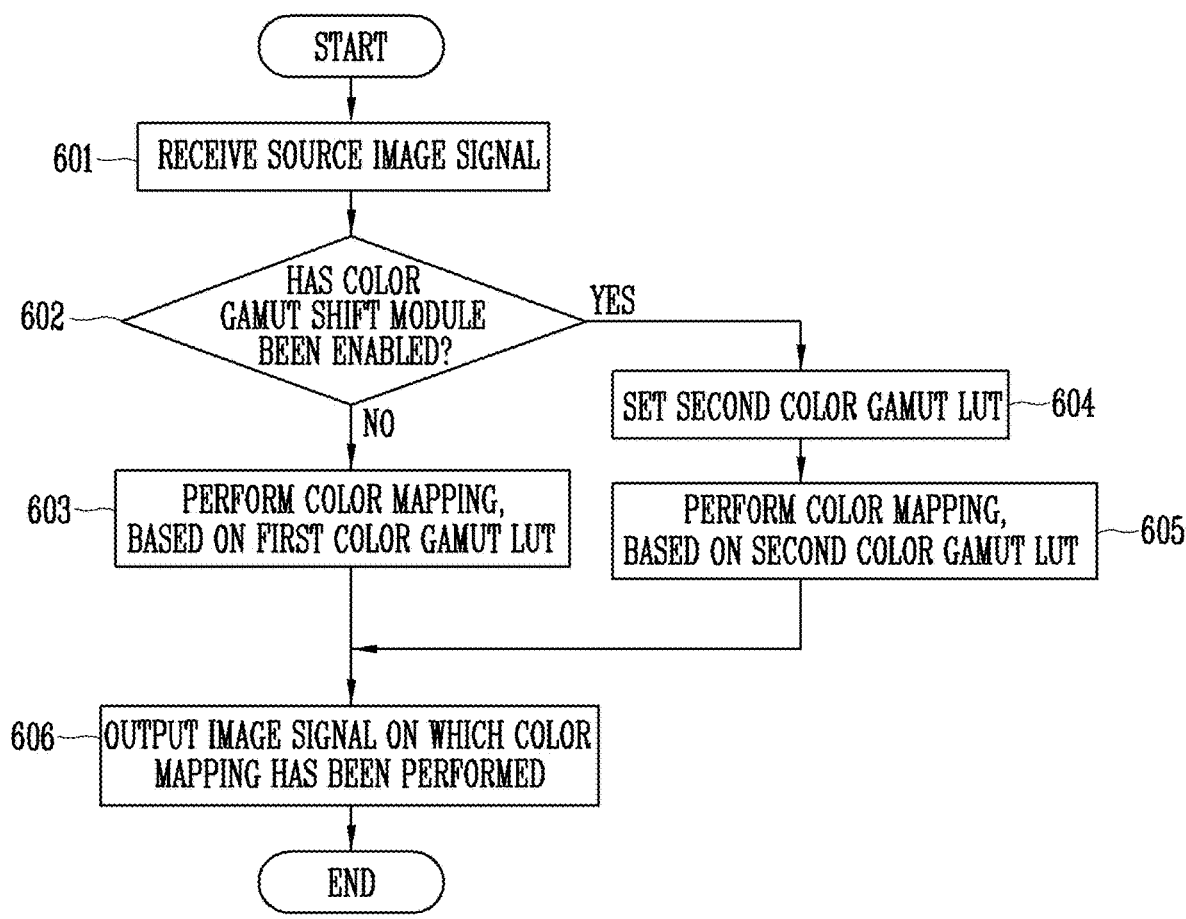
FIG. 6 is a flowchart illustrating an embodiment of a method for controlling a color gamut according to the disclosure.

FIG. 6 is a flowchart illustrating an embodiment of a method for controlling a color gamut according to the disclosure.

Referring to FIG. 6, in an embodiment, the device 100 may receive a source image signal R, G and B (601). The device 100 may receive the source image signal R, G and B from an outside through the color mapping module 110.

In an embodiment, when the color gamut shift module 120 of the device 100 is not enabled (602), the device 100 may perform color mapping through the color mapping module 110, based on a first color gamut LUT LUT1 (603). In such an embodiment, when a plurality of first color gamut LUTs LUT1 corresponding to a plurality of color reproduction modes, respectively, is used, the color mapping module 110 may perform color mapping, based on a first color gamut LUT LUT1 corresponding to a color reproduction mode set in the display device in which the device 100 is operated.

When the color gamut shift module 120 of the device 100 is enabled (602), the device 100 may set a second color gamut LUT LUT2 through the color gamut shift module 120 (604). The color gamut shift module 120 may organize the second color gamut LUT LUT2 from the first color gamut LUT LUT1, using a grayscale value light_sel determined according to an environmental factor or a user control. The device 100 may perform color mapping through the color mapping module 110, based on the second color gamut LUT LUT2 set in the color gamut shift module 120.

In such an embodiment, the device may perform color mapping through the color mapping module 110, based on the second color gamut LUT LUT2 (605).

The device 100 may output an image signal, on which the color mapping has been performed, to an outside, based on the first color gamut LUT LUT1 or the second color gamut LUT LUT2 (606).

FIG. 7 is a table illustrating a simulation result of the method according to the disclosure.

The table of FIG. 7 represents current consumption amounts when an embodiment of the method according to the disclosure is simulated, using a source image signal of a dot pattern image having high complexity.

First and second columns illustrate enable states of the color mapping module 110 and the color gamut shift module 120, respectively. In the table, a parameter having the value of '0' represents that a corresponding module is in a disable state, and the parameter having the value of '1' represents that the corresponding module is in an enable state. The third column of the table represents current consumption amounts of the display device according to the enable and disable states of the color mapping module 110 and the color gamut shift module 120.

As for a first row, the current consumption amount when the device 100 is enabled, i.e., when both the color mapping module 110 and the color gamut shift module 120 are disabled, was measured as about 1.2 milliampere (mA). On a second row, the current consumption amount when the color mapping module 110 is enabled and the color gamut shift module 120 is disabled was measured as about 3.5 mA.

Third to fifth rows represent current consumption amounts when both the color mapping module 110 and the color gamut shift module 120 are enabled. The third row represents a current consumption amount when a grayscale value light_sel according to an external factor or user setting is the maximum value (e.g., 255), the fourth row represents a current consumption amount when the grayscale value light_sel is an intermediate value (e.g., 50), and the fifth row represents a current consumption amount when the grayscale value light_sel is the minimum value (e.g., 0).

Referring to the current consumption amounts of the third to fifth rows, as the grayscale value light_sel increases, the current consumption amount decreases when the control of color shift increases. The current consumption amount even when the maximum current consumption amount occurs through driving of the color gamut shift module 120 (the fifth row) does not increase as compared with that when the color gamut shift module 120 is disabled.

In an embodiment of a method the disclosure, the device 100 may be driven with low power even when both the color mapping module 110 and the color gamut shift module 120 are enabled to perform a function (e.g., when a blue-light function is used). In such an embodiment of a method according to the disclosure, when the grayscale value light_sel according to the external factor or the user setting becomes the maximum value (e.g., when the blue-light function is set to the maximum), the power consumption of the device 100 may be reduced.

FIG. 8 is a block diagram illustrating an embodiment of a display device including the device according to the disclosure.

Referring to FIG. 8, an embodiment of the display device 10 may include the device for controlling color gamut 100, a signal controller 200, a data driver 300, a gate driver 400 and a display panel 500.

The device for controlling color gamut 100 processes a source image signal R, G and B, using a color gamut LUT, and provides the processed signal to the signal controller 200. In an embodiment, when the color gamut shift module 120 is not enabled, the device 100 may process the source image signal R, G and B, based on a first color gamut LUT LUT1 corresponding to a color reproduction mode. In such an embodiment, when the color gamut shift module 120 is enabled, the device 100 may process the source image signal R, G and B, based on a second color gamut LUT LUT2 set by the color gamut shift module 120, corresponding to an external factor or a user setting. In such an embodiment, the device for controlling color gamut 100 is substantially the same as those described above, and any repetitive detailed description thereof will hereinafter be omitted.

In an embodiment, the signal controller 200 may convert the image signal received from the device 100 into data by processing the image signal according to an input control signal. In such an embodiment, the signal controller 200 may generate a gate control signal, a data control signal, and the like, based on the image signal and the input control signal. The signal controller 200 may transfer the data and the data control signal to the data driver 300, and transfer the gate control signal to the gate driver 400.

The data driver 300 receives the data and the data control signal from the signal controller 200, and selects a grayscale voltage corresponding to each data, thereby generating the data as a data voltage, that is, an analog data signal. The data driver 300 may be connected to data lines of the display panel 500 to apply the data voltage to a corresponding data line.

The gate driver 400 receives the gate control signal from the signal controller 200, and generates a gate signal configured with a combination of a gate-on voltage, at which a switching element of each pixel is turned on, and a gate-off voltage, at which the switching element is turned off. The gate driver 400 may be connected to gate lines of the display panel 500 to apply the gate signal to the gate lines.

The display panel 500 includes a plurality of pixels. Each pixel may be electrically connected to a corresponding data line and a corresponding gate line, which intersect each other.

In embodiments of the device and method, and the display device including the device, a color gamut is adaptively changed according to an external factor such as a peripheral environment or a user feeling of the display device. Thus, distortion caused by color mapping may be effectively prevented, and an accurate color may be expressed.

In such embodiments of the device and method, and the display device including the device, the color gamut shift module is designed to be driven with low power, so that color expression may be performed on an image having high complexity without an increase in current consumption.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A device for controlling a color gamut, the device comprising:
    a color mapping module which converts a source image signal, based on a first color gamut look-up table; and
    a color gamut shift module which generates a second color gamut look-up table, based on a grayscale value determined corresponding to an external factor or a user setting,
    wherein, when the color gamut shift module is enabled, the color mapping module converts the source image signal, based on the second color gamut look-up table,
    wherein the color gamut shift module receives an enable signal having a first high level and a first low level from a display device, and
    the first high level is higher than the first low level,
    wherein the color gamut shift module generates the second color gamut look-up table in a section in which the color gamut shift module receives the enable signal of the first high level, and
    wherein the display device includes N pixels in a vertical direction, a vertical synchronization signal of the display device has a second high level and a second low level, a horizontal synchronization signal of the display device has a third high level and a third low level, the second high level is higher than the second low level, the third high level is higher than the third low level, the enable signal is output with the first high level in a section, in which the vertical synchronization signal has the second high level and the horizontal synchronization signal has the N-th third low level, and wherein N is a natural number.

2. The device of claim 1, wherein
    the first color gamut look-up table defines an output color gamut having a shape obtained by moving grid points of a source color gamut of the source image signal with a same vector, and
    the second color gamut look-up table defines an output color gamut having a shape obtained by moving a white point of the source color gamut to an interpolation point determined according to the grayscale value.

3. The device of claim 1, wherein the color gamut shift module organizes the second gamut look-up table by moving a white point of the first color gamut look-up table to an interpolation point determined according to the grayscale value.

4. The device of claim 3, wherein the color gamut shift module includes:
    a first processor which outputs, as first output values, values obtained by multiplying parameters of the first color gamut look-up table and corresponding parameters of a reference look-up table determined corresponding to the interpolation point;
    a second processor which outputs, as second output values, values obtained by dividing the first output values by a predetermined parameter corresponding to an interpolation section including the interpolation point;
    a third processor which collects the second output values and organizes the second output values as a table having a same dimension as the first color gamut look-up table; and
    a fourth processor which outputs the second color gamut look-up table generated by adding the first color gamut look-up table and the table.

5. The device of claim 4, wherein the second processor is defined by a single divider which processes calculations on the first output values in series.

6. The device of claim 1, wherein the external factor includes at least one of a brightness sensed through an illumination sensor and an emotion of a user sensed through a temperature sensor and a pulse sensor.

7. A method of controlling a color gamut, the method comprising:
    receiving a source image signal;
    receiving an enable signal having a first high level and a first low level which is lower than the first high level from a display device;
    when a color gamut shift module is not enabled, converting and outputting the source image signal, based on a first color gamut look-up table; and
    when the color gamut shift module is enabled, converting and outputting the source image signal, based on a second color gamut look-up table,
    wherein the second color gamut look-up table is generated based on a grayscale value determined corresponding to an external factor or user setting,
    wherein the second color gamut look-up table is generated in a section in which the enable signal of the first high level is received from the display device in a first frame section immediately prior to a second frame section, and
    wherein the display device includes N pixels in a vertical direction, a vertical synchronization signal of the display device has a second high level and a second low level, a horizontal synchronization signal of the display device has a third high level and a third low level, the second high level is higher than the second low level, the third high level is higher than the third low level, the enable signal is output with the first high level in a section, in which the vertical synchronization signal has the second high level and the horizontal synchronization signal has the N-th third low level, and wherein N is a natural number.

8. The method of claim 7, wherein the first color gamut look-up table defines an output color gamut having a shape obtained by moving grid points of a source color gamut of the source image signal with a same vector, and
    the second color gamut look-up table defines an output color gamut having a shape obtained by moving a white point of the source color gamut to an interpolation point determined according to the grayscale value.

9. The method of claim 7, wherein the converting and outputting the source image signal, based on the second color gamut look-up table includes:
    organizing the second color gamut look-up table by moving a white point of the first color gamut look-up table to an interpolation point determined corresponding to the grayscale value;
    converting the source image signal, based on the organized second color gamut look-up table; and outputting the source image signal converted based on the organized second color gamut look-up table.

10. The method of claim 9, wherein the organizing the second color gamut look-up table includes:
outputting first output values, which are obtained by multiplying parameters of the first color gamut look-up table and corresponding parameters of a reference look-up table determined corresponding to the interpolation point;
outputting second output values, which are obtained by dividing the first output values by a predetermined parameter corresponding to an interpolation section including the interpolation point;
collecting the second output values and organizing the second output values as a table having a same dimension as the first color gamut look-up table; and
generating the second color gamut look-up table by adding the first color gamut look-up table and the table.

11. The method of claim 10, wherein the outputting the second output values is performed by a single divider which processes calculations on the first output values in series.

12. The method of claim 7, wherein the external factor includes at least one of a brightness sensed through an illumination sensor and an emotion of a user sensed through a temperature sensor and a pulse sensor.

13. A display device comprising:
a device which controls a color gamut, wherein the device includes:
a color mapping module which converts a source image signal, based on a first color gamut look-up table; and
a color gamut shift module which generates a second color gamut look-up table, based on a grayscale value determined corresponding to an external factor or a user setting;
a signal controller which outputs data generated based on a converted source image signal;
a data driver which outputs a data voltage corresponding to the data as a data signal; and
a display panel which outputs an image corresponding to the data voltage,
wherein, when the color gamut shift module is enabled, the color mapping module converts the source image signal, based on the second color gamut look-up table,
wherein the display panel includes N pixels in a vertical direction, a vertical synchronization signal of the signal controller has a second high level and a second low level, a horizontal synchronization signal of the signal controller has a third high level and a third low level, the second high level is higher than the second low level, the third high level is higher than the third low level, the enable signal is output with the first high level in a section, in which the vertical synchronization signal has the second high level and the horizontal synchronization signal has the N-th third low level, and
wherein N is a natural number.

14. The display device of claim 13, wherein
the first color gamut look-up table defines an output color gamut having a shape obtained by moving grid points of a source color gamut of the source image signal with a same vector, and
the second color gamut look-up table defines an output color gamut having a shape obtained by moving a white point of the source color gamut to an interpolation point determined according to the grayscale value.

15. The display device of claim 13, wherein the color gamut shift module organizes the second color gamut look-up table by moving a white point of the first color gamut look-up table to an interpolation point determined according to the grayscale value.

* * * * *